United States Patent [19]

Alyfuku et al.

[11] Patent Number: 5,253,001
[45] Date of Patent: Oct. 12, 1993

[54] CAMERA HAVING MODE FOR MULTIPLE EXPOSURE PSEUDO-TELESCOPIC PHOTOGRAPHY

[75] Inventors: Kiyoshi Alyfuku, Yokohama; Yuichiro Konishi, Tokyo; Shuichi Tamura, Yokohama, all of Japan

[73] Assignee: Canon Kabushiki Kaisha, Tokyo, Japan

[21] Appl. No.: 817,348

[22] Filed: Jan. 6, 1992

Related U.S. Application Data

[63] Continuation of Ser. No. 681,644, Apr. 8, 1991, Pat. No. 5,095,324.

[30] Foreign Application Priority Data

May 29, 1987 [JP] Japan .................................. 62-133702
Jul. 20, 1987 [JP] Japan .................................. 62-180637
Jul. 22, 1987 [JP] Japan .................................. 62-182718

[51] Int. Cl.$^5$ ............................................. G03B 17/24
[52] U.S. Cl. ..................................................... 354/106
[58] Field of Search ............... 354/105, 106, 173.1, 354/209, 266

[56] References Cited

U.S. PATENT DOCUMENTS

| | | | |
|---|---|---|---|
| 3,490,844 | 1/1970 | Sapp | 355/40 |
| 4,470,677 | 9/1984 | Tsujimoto et al. | 354/106 |
| 4,639,111 | 1/1987 | Harvey | 354/106 X |
| 4,723,141 | 2/1988 | Hamada et al. | 354/173.1 X |
| 4,780,735 | 10/1988 | Taniguchi et al. | 354/106 X |
| 5,095,324 | 3/1992 | Alyfuku et al. | 354/106 |

FOREIGN PATENT DOCUMENTS 61-285432 12/1986 Japan .

Primary Examiner—Michael L. Gellner
Assistant Examiner—Howard B. Blankenship
Attorney, Agent, or Firm—Fitzpatrick, Cella, Harper & Scinto

[57] ABSTRACT

A camera includes a recording device for recording data on a film, a data setting device for setting the data to be recorded, a mode selecting device for selecting between a multiple exposure photography mode and a normal photography mode, a varying device for varying the data set by the data setting device, an inhibition device having an operative state for inhibiting the varying device from varying the data set by the data setting device, and a non-operative state for allowing the varying device to vary the data set by the data setting device, and a maintenance device for maintaining the operative state of the inhibition device while the multiple exposure photography mode is selected, and for transitioning to the non-operative state of the inhibition device when multiple exposure photography is terminated.

14 Claims, 9 Drawing Sheets

CAMERA HAVING MODE FOR MULTIPLE EXPOSURE PSEUDO-TELESCOPIC PHOTOGRAPHY

This application is a continuation of application Ser. No. 07/681,644, filed Apr. 8, 1991, now U.S. Pat. No. 5,095,324.

BACKGROUND OF THE INVENTION

1. Field of the Invention

The present invention relates to a pseudo format camera which has an objective lens for forming an image of an object on a frame of a film, and a selection means for selecting, from an actual field of the objective lens, a pseudo telescopic photography field which is reduced so as to cover only a portion of the object.

2. Related Background Art

In Japanese Patent Laid-Open (Kokai) No. 61-285432 and U.S. Pat. No. 3,490,844, a method of forming a pseudo telescopic photograph by changing a magnification during printing from a film which was photographed without using a telescopic lens, and a method of recording on a film a code corresponding to a focal length at which pseudo telescopic photography is required have been disclosed. In the photographing techniques of a camera, multiple exposure photographing techniques, which may be called trick photography, are known. For example, in one method, photographing operations are performed a plurality of times to overlap images on each other. In another method, a portion of a picture is shielded and partially shielded pictures are output in parallel form With this multiple exposure photographing technique, phenomena which cannot occur at the same time are photographed, thus allowing photographing of a retrospect scene, fantasic scene, and the like.

However, when switching between a standard photographing mode to a pseudo telescopic photographing mode or between pseudo telescopic photographing modes of different degrees is erroneously or accidentally made during the multiple exposure photographing, unexpected codes may be finally photographed on a film if codes are photographed upon every photographing. Thus, the unexpected codes which do not belong to any pseudo telescopic photographing codes are photographed, and automatic printing is disturbed during printing. For example, assume that no code representing a standard photographing mode is provided. When the standard photographing and pseudo telescopic photographing operations are performed during the multiple exposure photographing and the pseudo telescopic photographing code is photographed, the pseudo telescopic photographing operation is undesirably performed in the standard photographing mode. Thus, a photograph may often be formed upon printing against the user's will.

SUMMARY OF THE INVENTION

The present invention has been made in consideration of the above situation and has as its object to provide a camera which comprises a recording means for recording printing conditions on a film and an inhibition means for inhibiting the recording means from simultaneously recording different printing conditions on a single frame of the film during multiple exposure photography, so that the different printing conditions are prevented from being recorded on a single frame of the film, thereby avoiding confusion upon film printing.

The above and other objects of the present invention will be apparent from the detailed description of the embodiments presented below.

DETAILED DESCRIPTION OF THE PREFERRED EMBODIMENTS

An embodiment of the present invention will be described with reference to the accompanying drawings.

Figure 1:
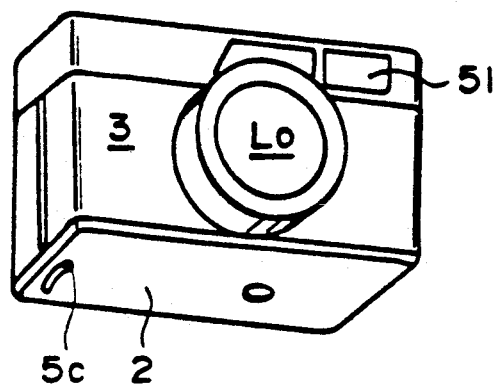
FIG. 1 is a perspective view showing a camera according to an embodiment of the present invention.

FIG. 1 is a perspective view of a camera according to an embodiment of the present invention. The camera shown in FIG. 1 includes a bottom cover 2 for covering a camera drive mechanism, a camera body 3, and a knob 5C of an multiple exposure switching operation lever 5 provided to the bottom cover 2. The knob 5C has a multiple exposure photographing position W and a normal exposure position S. The camera also includes a photographing lens $L_0$ and a finder 51.

Figure 2A:
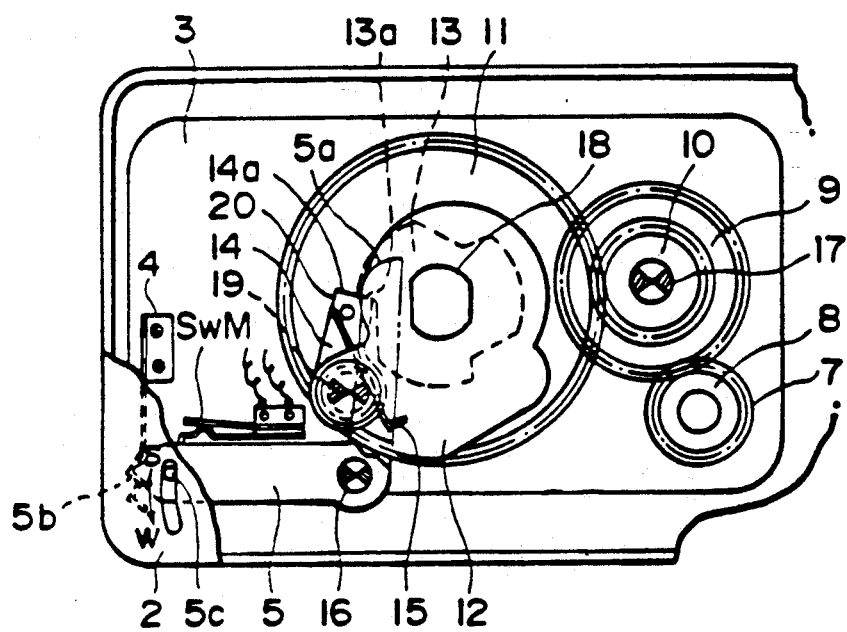
FIG. 2A is a partial cutaway perspective view showing an internal structure of the camera shown in FIG. 1.
Figure 2B:
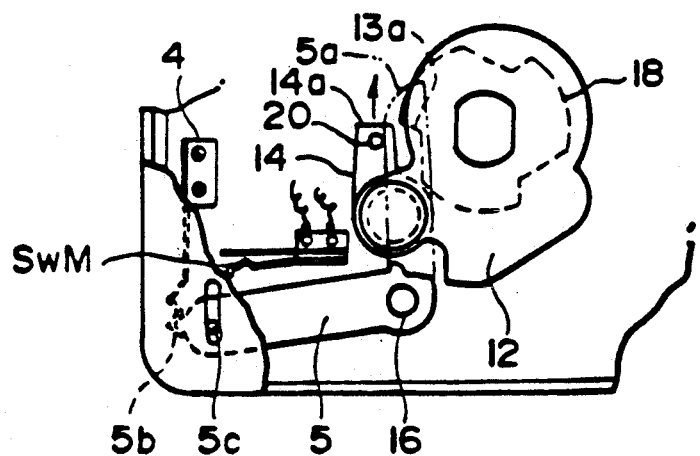
FIG. 2B is a partial enlarged view of the camera shown in FIG. 1.

FIGS. 2A and 2B are partial cutaway views showing a multiple exposure mechanism of the camera shown in FIG. 1, and, respectively, show states wherein the multiple exposure switching operation lever is switched to the normal exposure photographing position and wherein it is switched to the multiple exposure photographing position. In FIGS. 2A and 2B, a positioning click stopper 4 is engaged with an end portion 5b of the multiple exposure switching operation lever 5 which pivots about a shaft 16. A gear 11 is formed integrally with a film feed amount index plate 13, and transmits a drive power to a sprocket (not shown) through gears 10, 9, and 7 and a clutch shaft 8 so as to wind up a film (not shown). A one-way clutch 12 is fitted in an oval portion of a film feed main shaft 18, which receives a drive force from a winding motor (to be described later) so as to be rotated integrally with the main shaft 18. The one-way clutch 12 has a feed pawl 14 which is biased clockwise by a spring 15 and is axially supported by a rotating shaft 19. The one-way clutch 12 transmits the drive force of the winding motor from the feed main shaft 18 to the index plate 13. A switch $SW_M$ is turned on/off in synchronism with the lever 5.

In a pseudo format camera having the arrangement shown in FIG. 1 and FIGS. 2A and 2B, the lever 5 is switched to the position S in a normal photographing mode wherein one picture is photographed on one frame, as shown in FIG. 2A. In this case, the switch $SW_M$ is turned on. When a shutter release is performed, exposure corresponding to a brightness of an object is performed by a known method, and a pseudo telescopic code is photographed in a pseudo telescopic mode, as will be described later.

Thereafter, the clutch 12 is rotated clockwise through the film feed main shaft 18 by the winding motor (to be described later), and the feed pawl 14 on the clutch 12 causes the index plate 13 to rotate clockwise. Then, the rotation is transmitted to the gears 11, 10, 9, and 7 to wind up a film by one frame. Thereafter, the shutter is charged by a mechanism (not shown) cooperating with the main shaft 18, thus preparing for the next photographing operation.

When a multiple exposure photographing operation is to be performed, the lever 5 is switched to the position W. The lever 5 pivots counterclockwise about the shaft 16, and one end 5a of the lever 5 abuts against a pin 20 projecting from the feed pawl 14 and causes the pawl 14 to rotate counterclockwise against the biasing force of the spring 15, thereby releasing engagement between the pawl 14 and a recess 13a of the index plate 13. At the same time, the switch $SW_M$ which is pressed by one end face of the lever 5 to be kept on is turned off, thus achieving the state shown in FIG. 2B.

After a first shutter release of the multiple exposure photographing mode is performed to photograph a first object, the main shaft 18 is rotated by the winding motor (to be described later). However, since the engagement between the pawl 14 and the index plate 13 is released, the rotation of the motor is not transmitted to the gears 11, 10, 9, and 7, and hence, film feeding is not performed. The shutter is only charged. Thereafter, objects for multiple exposure are exposed a plurality of times on the previously exposed picture while the switch $SW_M$ is kept off.

Before the final object to be multiply exposed on the previously exposed picture is photographed, the lever 5 is switched to the position S. In this case, the switch $SW_M$ is turned on, as described above. When the shutter release is then performed, a desired pseudo telescopic code is photographed together with the final object for multiple exposure, as will be described later. Thereafter, the film is wound up by the winding motor (to be described later) by one frame, and the shutter is charged, thus preparing for the next photographing operation.

Figure 3:
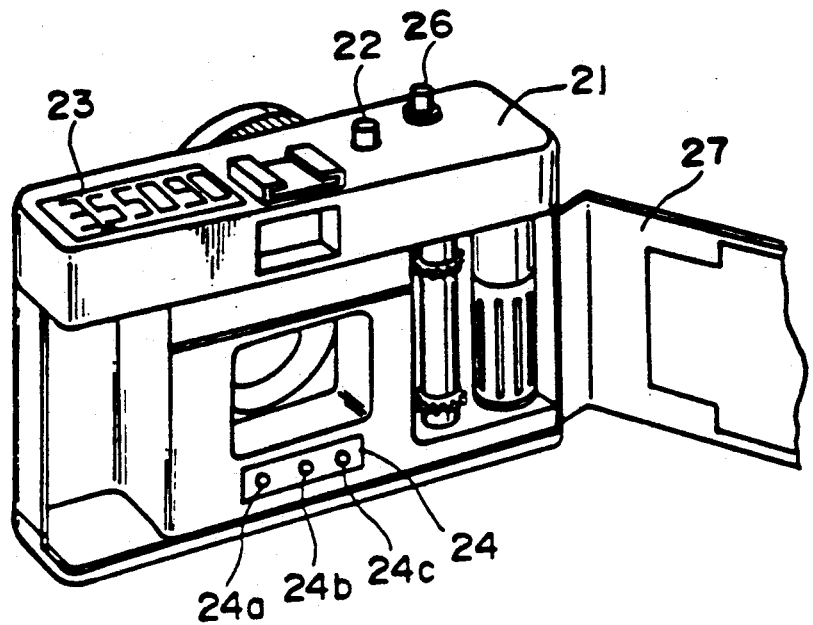
FIG. 3 is a perspective view showing a state wherein a back cover of the camera shown in FIG. 1 is opened.

FIG. 3 shows a state wherein a back cover 27 of the camera shown in FIG. 1 is opened. In FIG. 3, a shutter release button 26, a pseudo telescopic setting button, and a pseudo telescopic focal length display section 23 comprising a liquid crystal board are arranged on a top cover 21. Each time the button 22 is depressed, the pseudo telescopic focal length is changed. More specifically, in this embodiment, each time the button is depressed, a mark "Δ", provided below numerals representing pseudo telescopic focal lengths, for indicating one of the focal lengths, is circulated and displayed on the display section 23 like 35→50→90→35→50, . . . . A liquid crystal code information plate 24 has circular code information portions 24a, 24b, and 24c which selectively provide transparent and opaque states upon operation of the button 22, as shown in Table 1 below. The portions 24a to 24c are changed upon change in display on the display section 23.

TABLE 1

| Pseudo Telescopic Focal Length (mm) | Code Information Section | | |
|---|---|---|---|
| | 24a | 24b | 24c |
| 35 (normal photographing) | transparent | opaque | opaque |
| 50 (pseudo telescopic photographing) | transparent | transparent | opaque |
| 90 (pseudo telescopic photographing | transparent | transparent | transparent |

Figure 4:
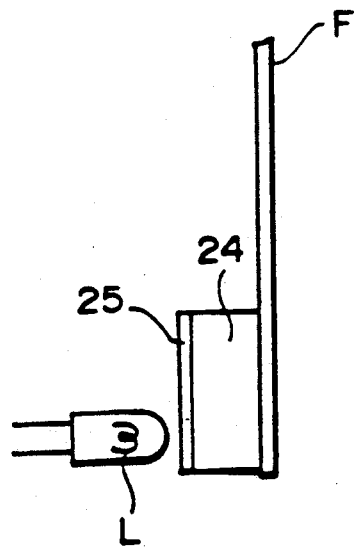
FIG. 4 is a view for explaining the positional relationship between a code information plate, a film, and a lamp shown in FIG. 3.

FIG. 4 shows the positional relationship between the liquid crystal code information plate 24, a lamp L, and a film F. In FIG. 4, a diffusion plate 25 is arranged between plate 24 and lamp L. When light emitted from the lamp L is uniformly incident on the liquid crystal code information plate 24 and the information portions 24a, 24b, and 24c are in the transparent state, the light from the lamp L is photographed on the film F.

Figure 5A:
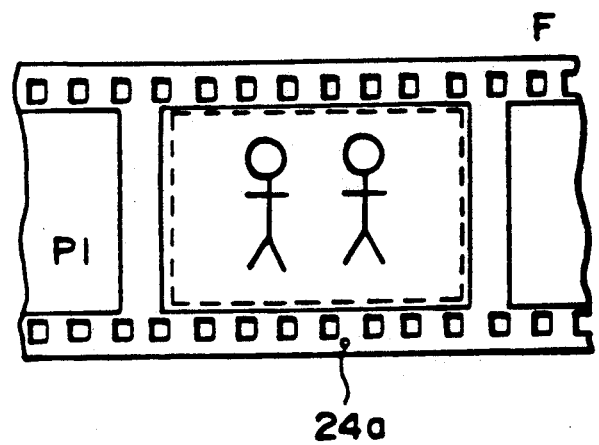
FIG. 5A is a view for explaining one relationship between a code information portion and a picture to be enlarged by the camera shown in FIG. 1.
Figure 5B:
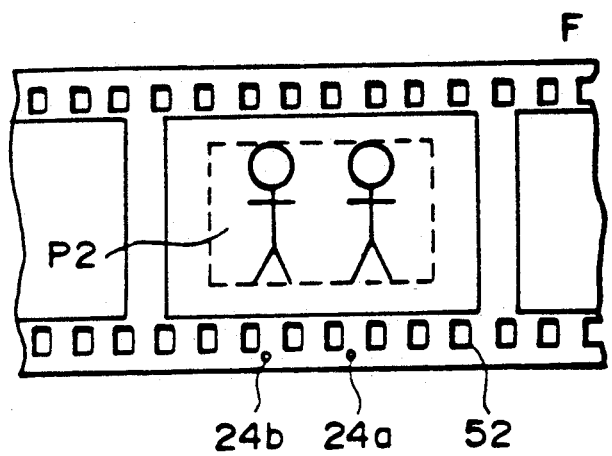
FIG. 5B is a view for explaining another relationship between the code information portion and the picture to be enlarged.
Figure 5C:
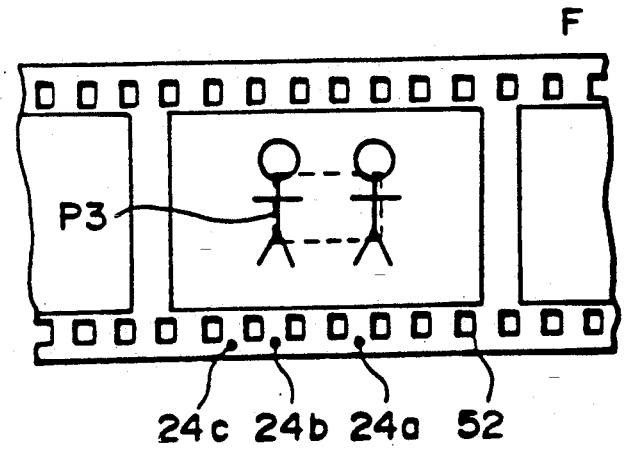
FIG. 5C is a view for explaining still another relationship between the code information portion and the picture to be enlarged.

FIGS. 5A to 5C show the relationships between the photographed code information portions and a picture to be expanded in accordance with a desired pseudo telescopic focal length. In FIG. 5A, the code information portion 24a is photographed, and a range P1 (entire picture) in FIG. 5A is printed. In FIG. 5B, since the code information portions 24a and 24b are photographed, a range P2 in FIG. 5B is trimmed during enlarging (printing). Therefore, in FIG. 5A, a photograph corresponding to a focal length of 35 mm is printed, and in FIG. 5B, a photograph corresponding to a focal length of 50 mm is printed. In FIG. 5C, since the code information portions 24a, 24b, and 24c are photographed, a range P3 is trimmed during enlarging (printing), and a photograph corresponding to a focal length of 90 mm is printed while the photograph shown in FIG. 5A corresponds to a focal length of 35 mm.

Figure 6:
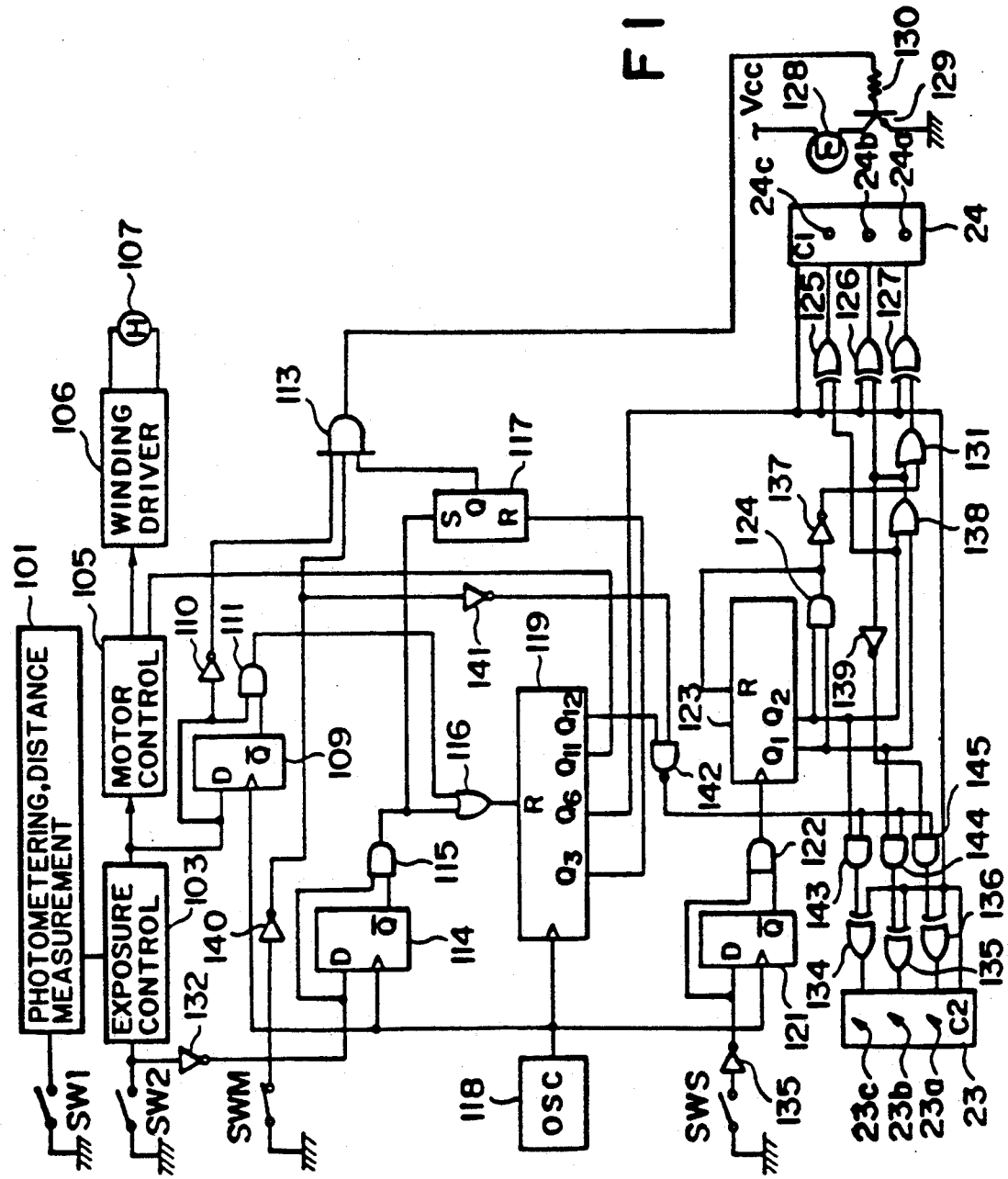
FIG. 6 is a circuit diagram showing an embodiment of an electric circuit of the camera shown in FIG. 1.

FIG. 6 shows an embodiment of an electrical circuit of the camera shown in FIG. 1. In FIG. 6, a switch $SW_1$ is used for photometry and distance measurement and is turned on to perform when the shutter release button 26 shown in FIG. 3 is depressed to a first stroke. A release switch $SW_2$ is turned on upon depression of the button 26 to the second stroke to open a shutter (not shown) and to close the shutter after a predetermined period of time has passed. A switch $SW_M$ is turned on/off to cooperate with the multiple exposure switching operation lever 5 in the multiple exposure photographing mode described with reference to FIGS. 2A and 2B. The switch $SW_M$ is turned off when the lever 5 is switched to the multiple exposure photographing position W. A switch $SW_S$ is used to select a pseudo telescopic code, and is turned on each time the pseudo telescopic setting button 22 (FIG. 3) is depressed. That is, each time the switch $SW_S$ is turned on, the degree of pseudo telescopy is changed.

The operation of the camera shown in FIG. 1 will be described with reference to FIG. 6.

In this case, assume that the normally-OFF type pseudo telescopic code selection switch $SW_S$ is not depressed. When the selection switch $SW_S$ is in this state, no count pulse is output from the output terminal of a one-shot circuit (to be referred to as a one-shot hereinafter) which is constituted by a D-type flip-flop (to be referred to as a D-FF hereinafter) 121 and an AND gate 122. Therefore, both the $Q_1$ and $Q_2$ outputs of a ternary counter 123 are set to be "0". At this time, the lever 5 (FIG. 2) is located at the position S indicating the normal photographing mode, and the switch $SW_M$ cooperating with the lever 5 is kept on. In addition, the output from a NAND gate 142, responsive to the output from the switch $SW_M$, is "1". Therefore, the output from an AND gate 145 is set to be "1" by the states of the outputs $Q_1$ and $Q_2$ of the counter 123. Thus, a mark 23a of the pseudo telescopic focal length display section 23 which is driven by an exclusive-OR gate (to be referred to as an EX-OR hereinafter) 136 is displayed, thereby indicating that a set pseudo telescopic focal length is 35 mm, i.e., a normal photographing mode. Since both the outputs $Q_1$ and $Q_2$ from the counter 123 are "0", only the code information portion 24a of the liquid crystal code display plate 24 is set in a transparent state through OR gates 138 and 131, and an EX-OR 127.

When the selection switch $SW_S$ is depressed once, the output $Q_1$ from the counter 123 becomes "1" and the output $Q_2$ therefrom becomes "0", a mark 23b is displayed through an AND gate 144 and an EX-OR 135, thereby indicating that the pseudo telescopic focal length is set to be 50 mm (first pseudo telescopic photographing mode). The EX-ORs 126 and 127 are driven depending on the state of the counter 123, and only the code information portions 24a and 24b are set in a transparent state. When the selection switch $SW_S$ is further depressed, the output $Q_1$ from the counter 123 becomes "0", and the output $Q_2$ therefrom becomes "1". Therefore, in the display section 23, a mark 23c is driven through an AND gate 143 and an EX-OR 134, thereby indicating that the pseudo telescopic focal length is 90 mm, i.e., the second pseudo telescopic photographing operation is performed. In the liquid crystal code display plate 24, EX-ORs 125, 126, and 127 are driven to set all the information portions 24a, 24b, and 24c in the transparent state.

In FIG. 6, an inverter 137 is connected to one input terminal of the OR gate 131, and an inverter 139 is connected to one input terminal of the EX-OR 126. An AND gate 134 is connected to the input terminal of the inverter 137. In the code display plate 24, a common electrode terminal $C_1$ of a liquid crystal is connected to an output terminal $Q_6$ for outputting a signal, for controlling the liquid crystal code display plate 24, of a counter 19, which frequency-divides a pulse signal generated by an oscillator 118. A common electrode terminal $C_2$ of the display section 23 is also connected to the output terminal $Q_6$. The marks 23a, 23b, and 23c, and the information portions 24a, 24b, and 24c are driven in accordance with the phase relationships between an AC signal applied to the common electrode terminals and the output states of the EX-ORs 125, 126, 127, 134, 135, and 136.

As described above, at this time, the mark 23a representing the normal photographing mode (35 mm) is displayed, and only the information portion 24a is set in a transparent state in order to photograph the code indicating the normal photographing mode on a film (not shown). In addition, since the multiple exposure switching operation lever 5 is switched to the position S, the normal photographing mode is set. Thus, under these conditions, a description of the operation of the camera will be continued.

When the shutter release button 26 (FIG. 3) is depressed to the first stroke, the switch $SW_1$ is turned on, and a known photometring and distance measurement circuit 101 is operated. Thus, photometering information corresponding to the brightness of an object and distance information corresponding to a distance to the object are output from the circuit 101 to an exposure control circuit 103.

When the release button 26 is depressed to the second stroke, the switch $SW_2$ cooperating with the button 26 is turned on, and a pulse signal is generated from the output of a one-shot (a D-FF 114 and an AND gate 115), thereby instantaneously resetting the counter 119 through an OR gate 116. Since the switch $SW_2$ is turned on, the exposure control circuit 103 is triggered, and controls a known automatic focusing mechanism (not shown) based on the distance information supplied from the circuit 101, thereby positioning a photographing lens (not shown) at an appropriate position. In addition, the circuit 103 opens/closes a known shutter (not shown) based on the photometering information, thereby completing exposure control of the film.

When the switch $SW_2$ is turned on, as described above, the one-shot (114 and 115) generates a pulse signal to set as RS flip-flop (to be referred to as an RS-FF hereinafter) 117 and instantaneously reset the counter 119 through the OR gate 116. Thus, the RS-FF 117 supplies data "1" to an AND gate 113 for a predetermined period of time, i.e., from when the switch $SW_2$ is turned on until the counter outputs an output $Q_3$.

An output from an inverter 110 connected to the exposure control circuit 103 is "1" during exposure control, i.e., while the shutter is kept open. In addition, since the normal photographing mode is set, the switch $SW_M$ is turned on, so that the AND gate 113 generates an output "1" from when the switch $SW_2$ is turned on until a reset signal is generated from the output $Q_3$ of the counter 119. Therefore, for a time interval determined by the output from the AND gate 113, a transistor 129 is turned on through a resistor 130, and a code photographing lamp 128 (the same as the lamp L shown in FIG. 4) emits light for this time interval to photograph a code indicating the normal photographing mode on the film through the code information portion 24a of the code display plate 24 during exposure.

When the exposure operation is completed as described above, the exposure control circuit 103 generates an exposure completion signal. Thus, a motor control circuit 105 drives a motor 107 through a driver 106, thereby operating the shutter charging mechanism and the film winding mechanism described above. Thus, the shutter is charged, and the film is wound up.

When the exposure completion signal is generated from the exposure control circuit 103, an output terminal of a one-shot (including a D-FF 109 and an AND gate 111), i.e., the output terminal of the AND gate 111 generates a pulse signal, thereby instantaneously resetting the counter 119. Thus, the motor control circuit 105 stops driving of the motor 107 in response to a motor control stop signal generated from an output terminal $Q_{11}$ of the counter 119 after a predetermined period of time has passed from the generation of the exposure completion signal. Thus, the motor 107 winds up the film by one frame.

When the shutter release button 26 (FIG. 3) is depressed for the next photographing operation, the exposure operation is performed in the same manner as described above, and a code is photographed during exposure. After the exposure operation is completed, the shutter is charged, and the film is wound up.

A case will be described wherein a multiple exposure photographing operation is performed after the above-mentioned normal photographing operation is executed. After all the operations, such as winding of the film, and the like, are completed, the lever 5 is switched to the position W in order to execute the multiple exposure photographing operation. Thus, the switch $SW_M$, cooperating with the lever 5, is turned off. When the switch $SW_M$ is turned off, the output from an inverter 140 becomes "0". The output of the AND gate 113 is inhibited in response to the OFF state of the switch $SW_M$. As a result, a code representing a pseudo telescopic focal length is inhibited from being photographed.

When the shutter release button 26 is depressed and the switches $SW_1$ and $SW_2$ are sequentially turned on, the photographing operation is completed in the same manner as in the normal photographing mode described above. When the exposure completion signal is generated from the exposure control circuit 103 upon completion of exposure, as described above, the motor 107 is driven for a time interval required for winding up the film by one frame in the same manner as in the normal photographing mode. However, in this case, since the engagement between the feed pawl 14 and the index plate 13 (FIG. 2) is released, the rotation of the motor 107 is not transmitted from the film feed main shaft 18 to the gears 11, 10, 9, and 7. Therefore, the feed operation of the film is not executed, and only the shutter is charged.

Of course, in this case, since the operation of the photographing lamp 128 (FIG. 6) is inhibited, no code is photographed on a frame.

Thereafter, when the shutter release button 26 is depressed to photograph the next object on the frame which was subjected to photographing once, i.e., to perform multiple exposure photographing operation, a desired object is photographed on the identical frame, thus completing the multiple exposure photographing operation.

The multiple exposure photographing operation can be executed every time the shutter release button is depressed under such conditions.

Thereafter, when the multiple exposure photographing operation is to be completed, the lever 5 is switched to the position S, i.e., the normal photographing position. Thus, the camera completes the multiple exposure photographing operation, and photographs a given pseudo telescopic focal length on the frame subjected to the multiple exposure photographing, as follows. In this state, no signal is supplied to the counter 123, and both the outputs $Q_1$ and $Q_2$ thereof are "0". Therefore, a code representing the normal photographing mode (35 mm) is photographed on the corresponding frame. When a first pseudo telescopic photographing code is to be photographed on the frame subjected to the multiple exposure photographing in order to obtain a photograph corresponding to a focal length of 50 mm, the code selection switch $SW_S$ need only be depressed once.

A description of the camera is further continued. When the shutter release button 26 is depressed as described above, exposure control is complete in the same manner as in the normal photographing mode described first. When the lever 5 is switched to the position S, the switch $SW_M$ cooperating with the lever 5 is turned on, and the AND gate 113 keeps outputting "1" for a predetermined period of time during exposure control. Therefore, the lamp 128 emits light for this time interval to photograph the code indicating the normal photographing mode on a film through the information portion 24a in the transparent state. Therefore, only one type of code is photographed on the frame subjected to the multiple exposure, and double exposure of the code can be prevented. When the exposure operation is completed and the exposure control circuit 103 generates the exposure completion signal, as described above, the motor 107 is rotated for a predetermined period of time determined by the signal from the output terminal $Q_{11}$ of the counter 119 to charge the shutter and to feed the film.

When the multiple exposure photographing mode is set and the switch $SW_M$ is in the OFF state as described above, the output from an inverter 141 is "1", and the output from a NAND gate 142 is repetitively turned on/off. Thus, a mask corresponding to the set code, e.g., the mark 23a flickers, thus signaling a multiple exposure photographing mode to a user.

Figure 7:
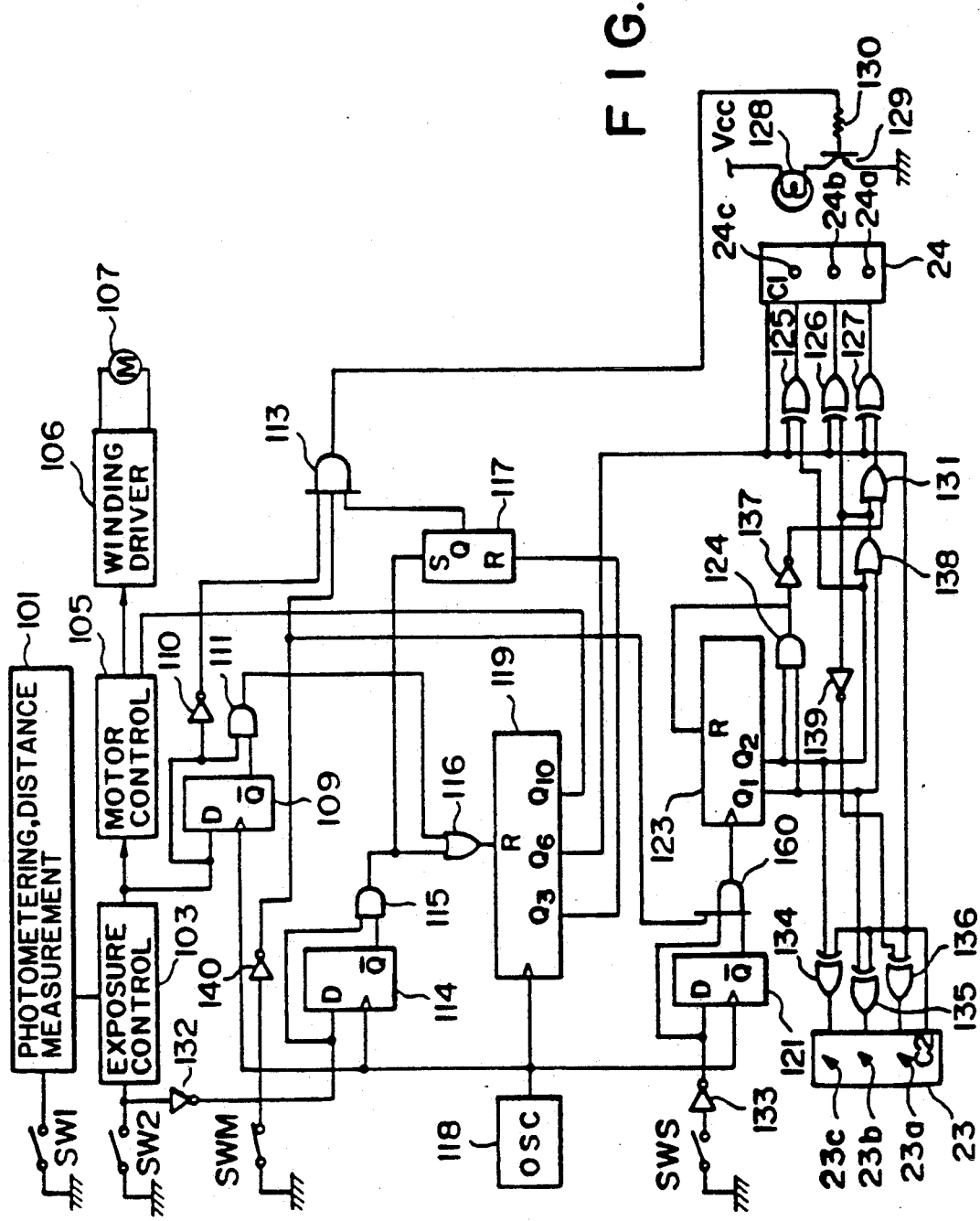
FIG. 7 is a circuit diagram showing another embodiment of an electric circuit of the camera shown in FIG. 1.

FIG. 7 shows another embodiment of an electrical circuit used in the camera shown in FIG. 1. The same reference numerals in FIG. 7 denote the components which perform the same or equivalent operations as in FIG. 6, and a description thereof will be omitted. In the embodiment shown in FIG. 7, when a multiple exposure photographing switch $SW_M$ is kept off, a lamp 128 is inhibited from being turned on, and the ON/OFF operation of a pseudo telescopic selection switch $SW_S$, i.e., alteration of a code is inhibited for the purpose of safety. When the switch $SW_M$ is kept off, the output from an inverter 140 becomes "0", and the output from an AND gate 160 is forcibly fixed to be "0". Therefore, a one-shot pulse signal generated upon turning on/off of the switch $SW_S$ cannot be output to a counter 123. Therefore, during the multiple exposure photographing operation, since the ON/OFF operation of the switch $SW_S$ is not accepted, codes can be prevented from being photographed twice by an erroneous operation of a user.

Figure 8:
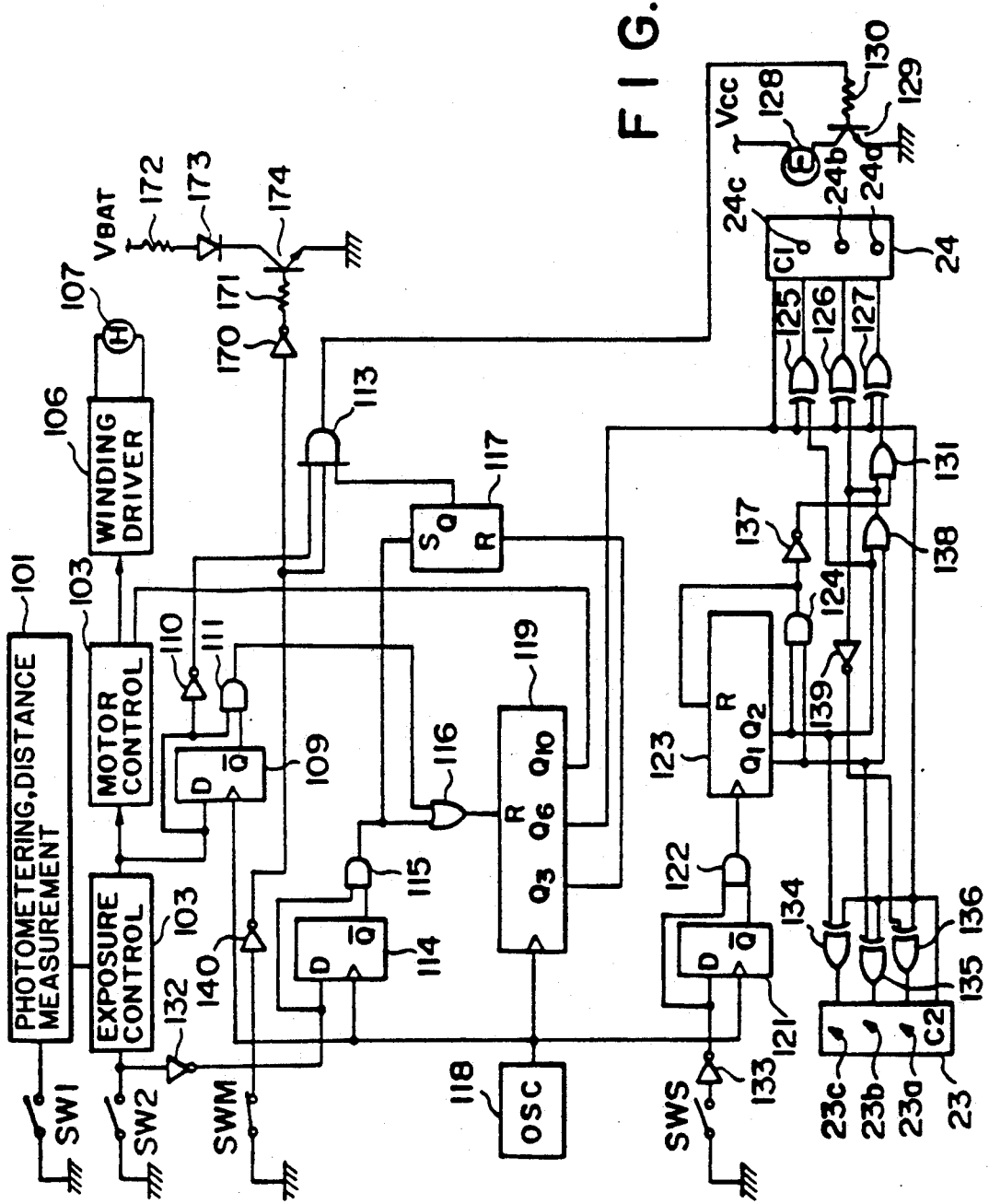
FIG. 8 is a circuit diagram showing still another embodiment of an electric circuit of the camera shown in FIG. 1.

FIG. 8 shows still another embodiment of an electrical circuit used in the camera shown in FIG. 1. The same reference numerals in FIG. 8 denote the components which perform the same or equivalent operations as in FIG. 6, and a description thereof will be omitted.

In FIG. 8, an LED 173 is turned on during multiple exposure photographing, thereby signaling the multiple exposure photographing mode to a user. More specifically, when a multiple exposure photographing switch $SW_M$ is turned off in the multiple exposure photographing mode, as described above, the output from an inverter 170 becomes "1", and a base current flows to a transistor 174 through a resistor 171 to turn on the transistor 174. Thus, a current flows to the LED 173 from a power supply $V_{BAT}$ through a resistor 172.

Figure 9:
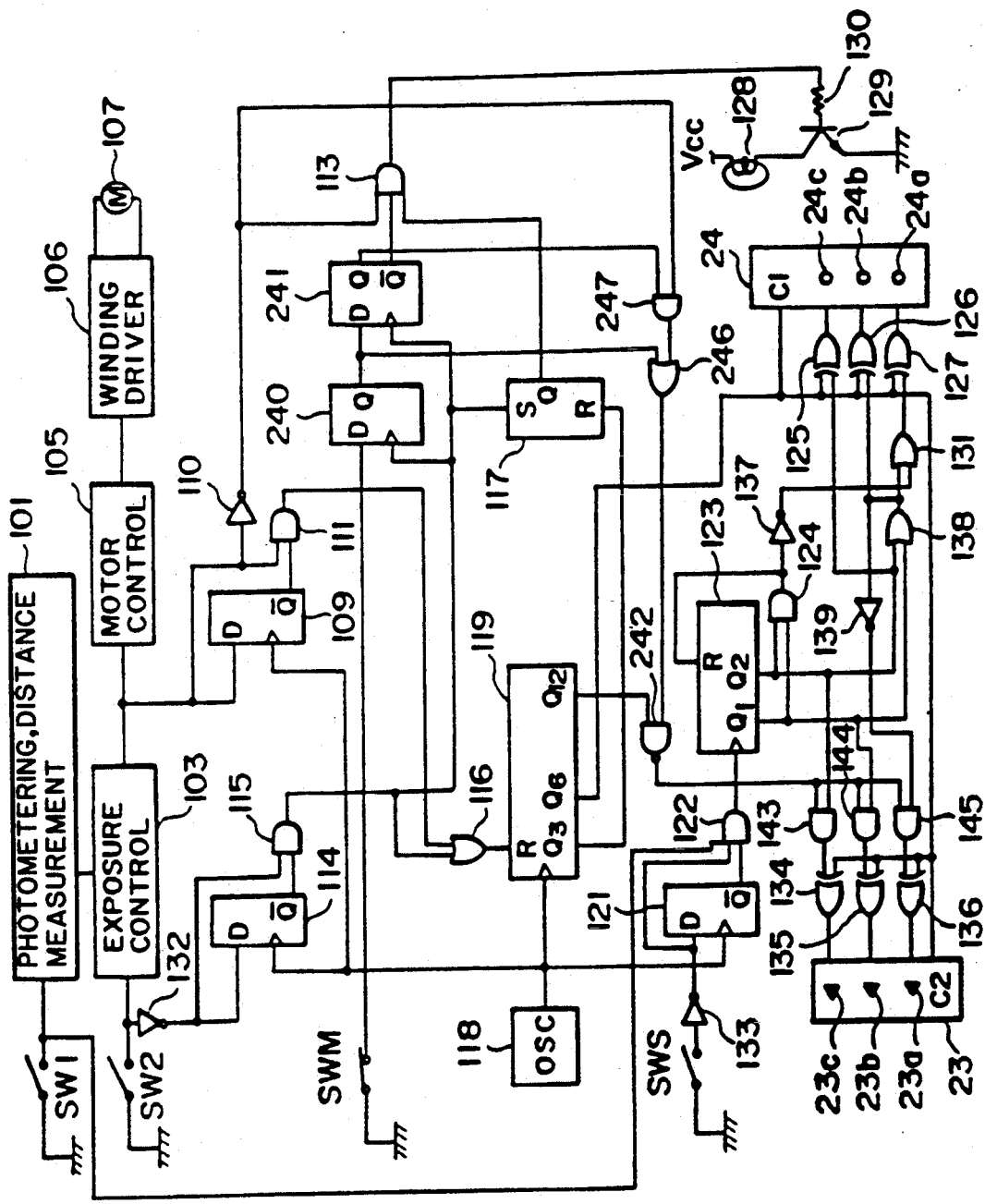
FIG. 9 is a circuit diagram showing still another embodiment of an electric circuit of the camera shown in FIG. 1.

FIG. 9 shows still another embodiment of an electrical circuit used in the camera shown in FIG. 1. The same reference numerals in FIG. 9 denote the components which perform the same or equivalent operations as in FIG. 6, and a description thereof will be omitted.

In FIG. 9, when a shutter release button 26 is depressed to a first stroke to turn on a switch $SW_1$, a signal "0" is input to an AND gate 122. Even when a pseudo telescopic setting button 22 (FIG. 3) is depressed to turn on a switch $SW_S$, the AND gate 122 does not output a signal "1". Therefore, a ternary counter 123 has the same content as that before the button 22 is depressed. The transparent and opaque states of the information portions of a liquid crystal code information plate 24, and the display state of a pseudo telescopic focal length display section 23 are left unchanged. When a user begins to depress the shutter release button 26 to perform photographing after he sets a desired pseudo telescopic focal length upon depression of the button 22 before photographing, if he accidentally depresses the button 22 to perform photographing, a photograph of the desired pseudo telescopic focal length can be printed. Even if he depresses the shutter release button 26 to the first stroke, he can release the button 26 and re-depress the button 22, so that he can change the pseudo telescopic focal length.

A multiple exposure photographing operation will be described below. In order to execute multiple exposure photographing after all the operations such as film winding are stopped, a multiple exposure switching operation lever 5 is switched to a position W. Then, a switch $SW_M$ cooperating with the lever 5 is turned off, as described above. When the switch $SW_M$ is turned off, a signal "1" is input to the D terminal of a D-FF 240. The shutter release button 26 is then depressed to sequentially turn on switches $SW_1$ and $SW_2$.

Figure 10:
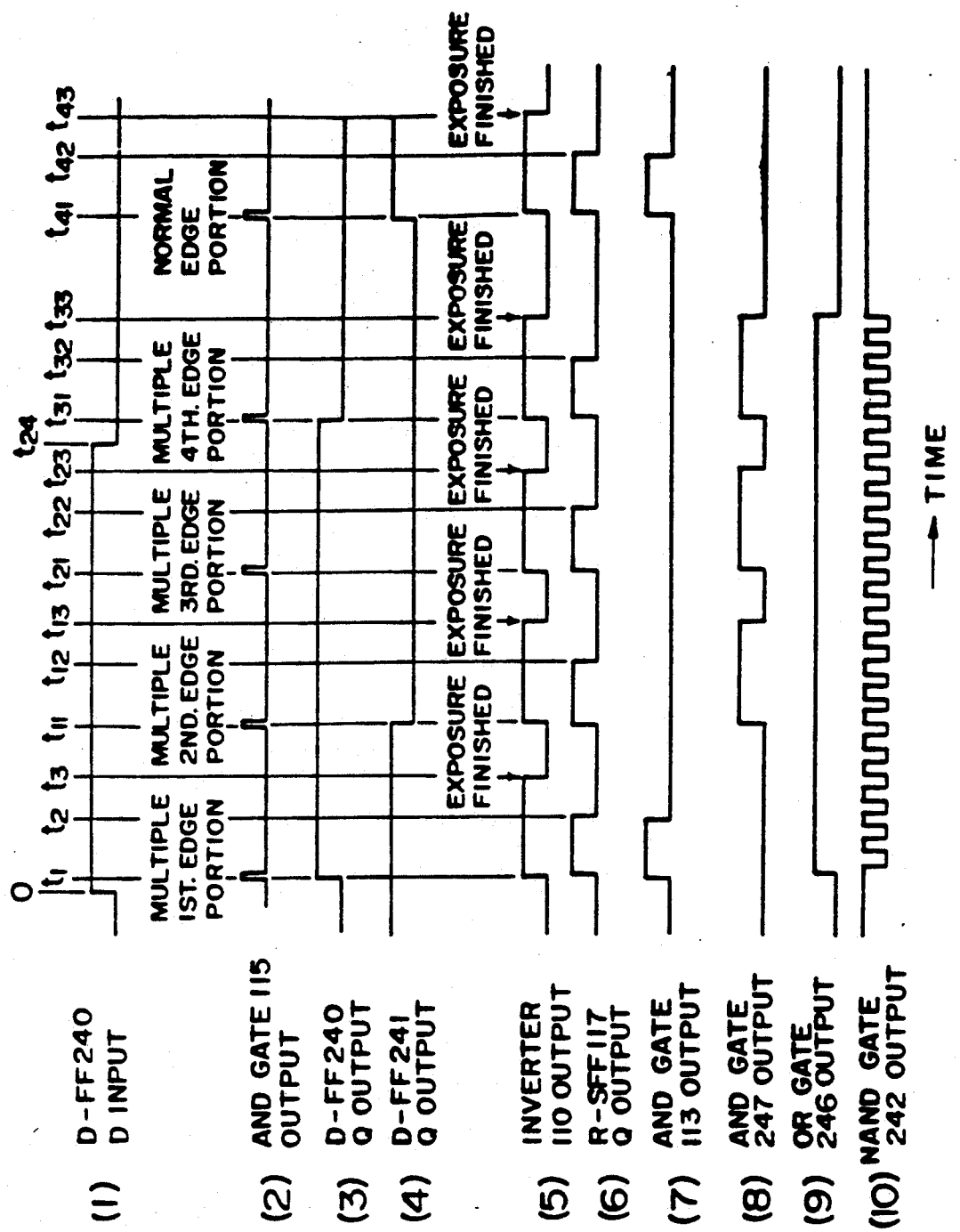
FIG. 10 is a timing chart for explaining inputs and outputs of respective components of the circuit shown in FIG. 9 as a function of time.

FIG. 10 is a timing chart of an output from an AND gate 113, which is input to a transistor 129 for controlling light emission of a code photographing lamp 128, and a display state of the pseudo telescopic focal length display section 23 when the lever 5 is switched to the position W to turn on the switch $SW_M$ and when the shutter release button 26 is depressed to the first and second strokes to sequentially turn on the switches $SW_1$ and $SW_2$ in FIG. 9.

Assume that a timing at which the lever 5 is switched to the position S to turn off the switch $SW_M$ is given as an origin, and a time is plotted along the abscissa.

In FIG. 10, three multiple exposure operations are performed on one frame of a picture while the switch $SW_M$ is turned off, and one multiple exposure operation is performed while the switch $SW_M$ is turned on. That is, a total of four exposure operations are performed.

Therefore, as shown in FIG. 10(1), the switch $SW_M$ is initially turned off, and is turned on after the third multiple exposure operation is completed. Therefore, a signal "1" appears at the D terminal of the D-FF 240 when the switch $SW_M$ is turned off, and a signal "0" appears at time $t_{24}$ upon on operation of the switch $SW_M$ after the third multiple exposure operation is completed.

During the first exposure operation in the multiple exposure photographing operation, the switch $SW_1$ is turned on in response to depression of the shutter release button 26 (FIG. 3) to the first stroke to operate a phtometering and distance measurement circuit 101, and the switch $SW_2$ is turned on in response to depression of the button 26 to the second stroke. Thus, a one-shot (D-FF 114 and AND gate 115) is operated in the same manner as in the normal photographing mode in the embodiment shown in FIG. 6, and generates a one-shot pulse each time the shutter release is performed, i.e., at times $t_1$, $t_{11}$, $t_{21}$, and $t_{31}$ in this embodiment, as shown in FIG. 10(2). Since the one-shot pulse is input to the clock terminals of D-FFs 240 and 241, the Q output of the D-FF 240 goes from "0" to "1" at time $t_1$, as shown in FIG. 10(3), and goes from "1" to "0" at time $t_{31}$.

The D-FFs 240 and 241 form a shift register circuit. The $\bar{Q}$ terminal of the D-FF 241 goes from "1" to "0" in response to the one-shot pulse generated during the second exposure operation in the multiple exposure photographing operation, as shown in FIG. 10(4), and then goes from "0" to "1" in response to the one-shot pulse for the next normal photographing operation.

In FIG. 10(5), the output terminal of an inverter 110 connected to an exposure control circuit 103 outputs a signal "1" during exposure control, i.e., from when the switch $SW_2$ is turned on until the exposure completion signal is output. Therefore, the inverter 110 outputs a signal "1" for a time interval between times $t_1$ and $t_3$, and outputs a signal "0" for a time interval between times $t_3$ and $t_{11}$. For the second and subsequent exposure operations in the multiple exposure photographing operation, the inverter outputs "1" from when the switch $SW_2$ is turned on until the exposure completion signal is output, and outputs "0" from when the exposure completion signal is output until the switch $SW_2$ is turned on in response to the next shutter release.

In FIG. 10(6), an RS-FF 117 outputs "1" for a predetermined period of time based on a signal output from the output $Q_3$ of the counter 119, i.e., for a time interval between times $t_1$ and $t_2$, as described above. This applies to the second and subsequent exposure operations in the multiple exposure photographing operation.

FIG. 10(7) shows the output of the AND gate 113. The AND gate 113 receives the $\bar{Q}$ output from the D-FF 241 shown in FIG. 10(4), the output from the inverter 110 shown in FIG. 10(7), and the Q output from the RS-FF 117 shown in FIG. 10(6). In the multiple exposure photographing operation, the AND gate 113 outputs "1" for a time interval between times $t_1$ and $t_2$ during the first exposure. During this time interval, the transistor 129 is turned on through a resistor 130, and the code photographing lamp 128 emits light to photograph a code indicating a desired pseudo telescopic focal length on a film through the code information portion of the code information plate 24. The Q output from the D-FF 241 and the output from the inverter 110 are input to an AND gate 247. The output from the AND gate 247 is input to one input terminal of an OR gate 246. The other input terminal of the OR gate 246 is connected to the Q output terminal of the D-FF 240. The output from the OR gate 246 and the $Q_{12}$ output terminal of a counter 119, which is oscillated at a predetermined frequency, are input to a NAND gate 242.

FIG. 10(8) shows the output from the AND gate 247, FIG. 10(9) shows the output from the OR gate 246, and FIG. 10(10) shows the output from the NAND gate 242.

When the switch $SW_S$ for selecting the pseudo telescopic code is depressed as in the normal photographing mode described above, since the switch $SW_1$ is kept off as long as the shutter release button 26 is not depressed, a clock pulse is input to a ternary counter 123 through a one-shot (D-FF 121 and AND gate 122), and one of AND gates 143, 144, and 145 outputs a pulse of a predetermined frequency in accordance with the values of $Q_1$ and $Q_2$ outputs. Thus, a mark flickers below the set pseudo telescopic focal length, thus indicating that multiple exposure is being performed. As shown in FIG. 10(10), the NAND gate 242 is oscillated at a predetermined frequency until all the multiple exposure operations are completed, i.e., until the fourth multiple exposure operation is completed. The mark flickers until the multiple exposure photographing operation is completed, thus signaling the multiple exposure mode to a user. Thereafter, a mark indicating a preset pseudo telescopic focal length is displayed.

As described above, when the lever 5 is switched to the position S to turn off the switch $SW_M$ and the exposure completion signal is generated from the exposure control circuit 103 upon completion of first to third exposure operations, the motor 107 is driven for a time period required for winding up a film by one frame in the same manner as in the normal photographing mode. However, in this case, since engagement between the feed pawl 14 and the film feed amount index plate 13 (FIG. 2) is released, the rotation of the motor 107 is not transmitted to the gears 11, 10, 9, and 7. Thus, the film feeding operation is not performed, and the shutter is only charged. When the lever 5 is switched to the position W to turn on the switch $SW_M$ and the final multiple exposure is performed, the film feeding operation is performed, and the shutter is charged.

In the timing chart shown in FIG. 10, when the switch $SW_2$ is turned on in response to depression of the shutter release button 26 to the second stroke at time $t_{41}$, a one-shot pulse is generated, as shown in FIG. 10(2), so that the inverter 110 outputs "1" and the $\bar{Q}$ output of the D-FF 241 outputs "1" during exposure control, as shown in FIG. 10(5). For a predetermined period of time based on a signal from the output $Q_3$ of the counter 119 from when the switch $SW_2$ is turned on, i.e., for a time interval between times $t_{41}$ and $t_{42}$, the RS-FF 117 outputs "1". Thus, the AND gate 113 outputs "1", and during this time interval, the transistor 129 is turned on through the resistor 130. The code photographing lamp 128 emits light during this time interval to photograph a code indicating the desired pseudo telescopic focal length on a film through the code information portion of the code information plate 24 during exposure.

Figure 11:
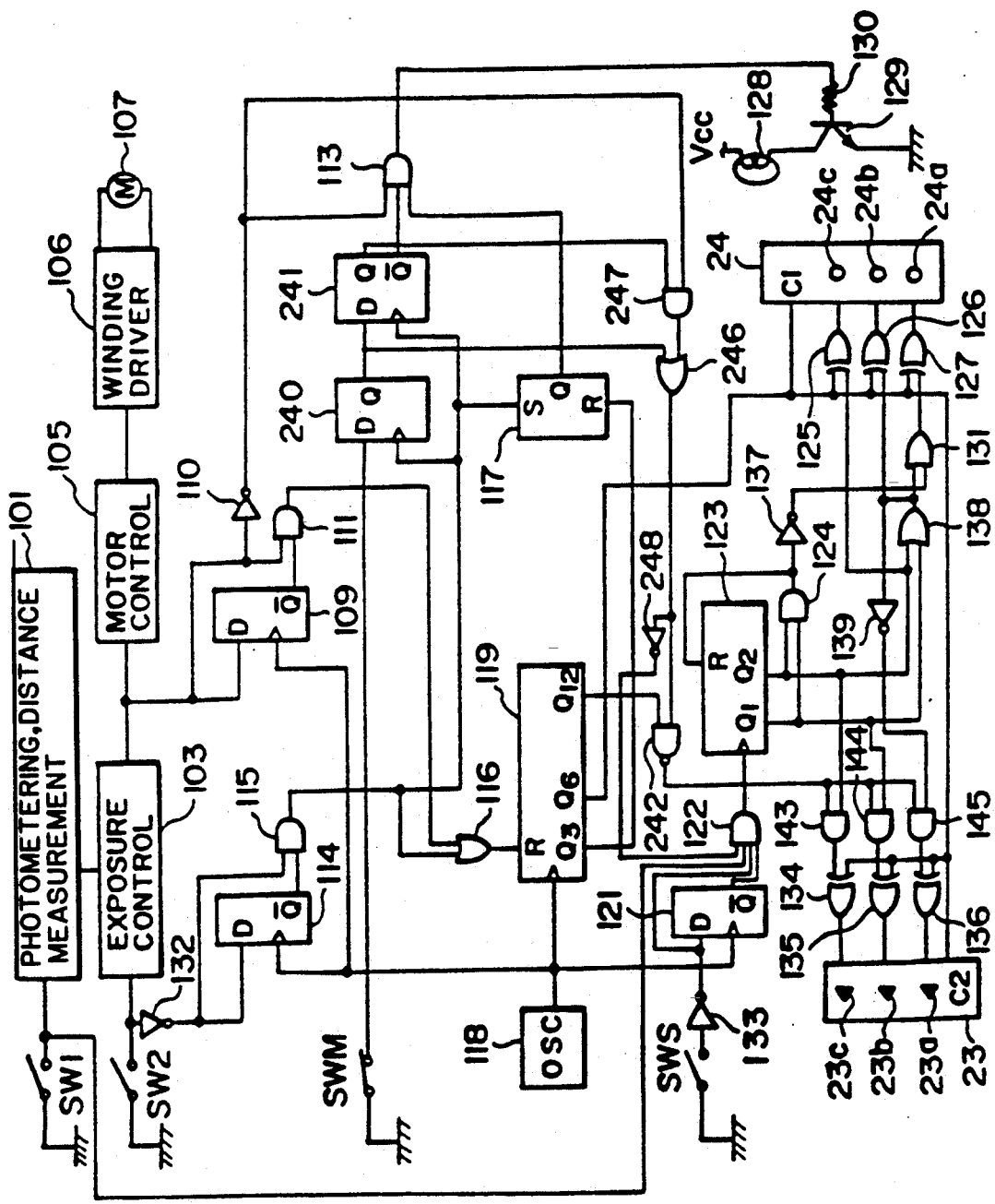
FIG. 11 is a circuit diagram showing still another embodiment of an electric circuit of the camera shown in FIG. 1.

FIG. 11 shows still another embodiment of an electrical circuit used in the camera shown in FIG. 1. The same reference numerals in FIG. 9 denote the components which perform the same or equivalent operations as in FIG. 11, and a description thereof will be omitted. In FIG. 11, the output from an OR gate 246 is input to an AND gate 122 through an inverter 248. More specifically, if a signal "0" is input to the AND gate 122 from the beginning to the end of multiple exposure photographing operation, even when a pseudo telescopic setting switch 22 is accidentally depressed to turn on a switch $SW_S$, the position of a mark on the pseudo telescopic focal length display section is left unchanged, and keeps flickering.

In the above embodiments, flickering indication is made during the multiple exposure photographing operation. However, the present invention is not limited to the flickering indication, but any indication which can specify a multiple exposure photographing operation may be employed.

In each of the above embodiments, information photographed on a film is pseudo telescopic focal length information. However, the present invention can be naturally applied even if the information is information indicating other printing conditions, such as pseudo wide-angle focal length information, printing time information, and the like.

In each of the above embodiment, recording of the pseudo telescopic focal length information is performed by photographing using light. However, the information may be recorded by any other means such as stamping.

What is claimed is:

1. A camera, comprising:
   (a) recording means for recording data on a film;
   (b) data setting means for setting the data to be recorded;
   (c) mode selecting means for selecting between a multiple exposure photography mode and a normal photography mode;
   (d) varying means for varying the data set by said data setting means;
   (e) inhibition means having an operative state for inhibiting said varying means from varying the data set by said data setting means, and a non-operative state for allowing said varying means to vary the data set by said data setting means; and
   (f) maintenance means for maintaining the operative state of said inhibition means while the multiple exposure photography mode is selected, and for transitioning to the non-operative state of said inhibition means when multiple exposure photography is terminated.

2. A camera, comprising:
   (a) recording means for recording data on a film;
   (b) data setting means for setting the data to be recorded;
   (c) mode selecting means for selecting between a multiple exposure photography mode and a normal photography mode;
   (d) varying means for varying the data set by said data setting means;
   (e) inhibition means having an operative state for inhibiting said varying means from varying the data set by said data setting means, and a non-operative state for allowing said varying means to vary the data set by said data setting means; and
   (f) maintenance means for maintaining the non-operative state of said inhibition means prior to an operation of a release member while the multiple exposure photography mode is selected, and for maintaining the operative state of said inhibition means after the operation of the release member.

3. A camera according to claim 2, wherein said maintenance means transitions to the non-operative state of said inhibition means upon termination of multiple exposure photography.

4. A camera, comprising:
   (a) recording means for recording data on a film;
   (b) data setting means for setting the data to be recorded;
   (c) mode selecting means for selecting between a multiple exposure photography mode and a normal photography mode;
   (d) varying means for varying the data set by said data setting means;
   (e) first inhibition means for inhibiting said recording means for recording different data on a single frame of the film during multiple exposure photography, wherein said first inhibition means includes means for inhibiting said recording means from recording data other than the data which are set in a first multiple exposure photography operation; and (f) second inhibition means for inhibiting said mode selecting means from changing between the multiple exposure photography mode and the normal photography mode in response to the multiple exposure photography mode being selected.

5. A camera according to claim 4, wherein said second inhibition means inhibits said mode selecting means from changing between the multiple exposure photography mode and the normal photography mode during multiple exposure photography.

6. A camera, comprising:
(a) recording means for recording data on a film;
(b) data setting means for setting the data to be recorded;
(c) mode selecting means for selecting between a multiple exposure photography mode and a normal photography mode;
(d) varying means for varying the data set by said data setting means;
(e) first inhibition means for inhibiting said varying means from varying the data set by said data setting means; and
(f) second inhibition means for inhibiting said varying means from varying the data set by said data setting means in response to an operation of a release member.

7. A camera according to claim 6, wherein said second inhibition means inhibits said varying means from varying the data set by said data setting means during multiple exposure photography.

8. A recording device for a camera having a mode selecting means for selecting a multiple exposure photography mode, comprising:
(a) recording means for recording data on a film;
(b) data setting means for setting the data to be recorded;
(c) varying means for varying the data set by said data setting means;
(d) inhibition means having an operative state for inhibiting said varying means from varying the data set by said data setting means, and a non-operative state for allowing said varying means to vary the data set by said data setting means; and
(e) maintenance means for maintaining the operative state of said inhibition means while the multiple exposure photography mode is selected, and for transitioning to the non-operative state of said inhibition means when multiple exposure photography is terminated.

9. A recording device for a camera having a mode selecting means for selecting a multiple exposure photography mode comprising:
(a) recording means for recording data on a film;
(b) data setting means for setting the data to be recorded;
(c) varying means for varying the data set by said data setting means;
(d) inhibition means having an operative state for inhibiting said varying means from varying the data set by said data setting means, and a non-operative state for allowing said varying means to vary the data set by said data setting means; and
(e) maintenance means for maintaining the non-operative state of said inhibition means prior to an operation of a release member while the multiple exposure photography mode is selected, and for maintaining the operative state of said inhibition means after the operation of the release member.

10. A camera according to claim 9, wherein said maintenance means transitions to the non-operative state of said inhibition means upon termination of multiple exposure photography.

11. A recording device for a camera having mode selecting means for selecting a multiple exposure photography mode, comprising:
(a) recording means for recording data on a film;
(b) data setting means for setting the data to be recorded;
(c) varying means for varying the data set by said data setting means;
(d) first inhibition means for inhibiting said recording means from recording different data on a single frame of the film during multiple exposure photography, wherein said first inhibition means includes means for inhibiting said recording means from recording data other than the data which are set in a first multiple exposure photography operation; and
(e) second inhibition means for inhibiting said mode selecting means from changing between the multiple exposure photography mode and the normal photography mode in response to the multiple exposure photography mode being selected.

12. A camera according to claim 11, wherein said second inhibition means inhibits said mode selecting means from changing between the multiple exposure photography mode and the normal photography mode during multiple exposure photography.

13. A recording device for a camera having a mode selecting means for selecting a multiple exposure photography mode, comprising:
(a) recording means for recording data on a film;
(b) data setting means for setting the data to be recorded;
(c) varying means for varying the data set by said data setting means;
(d) first inhibition means for inhibiting said varying means from varying the data set by said data setting means; and
(e) second inhibition means for inhibiting said varying means from varying the data set by said data setting means in response to an operation of a release member.

14. A camera according to claim 13, wherein said second inhibition means inhibits said varying means from varying the data set by said data setting means during multiple exposure photography.

* * * * *

UNITED STATES PATENT AND TRADEMARK OFFICE
CERTIFICATE OF CORRECTION

PATENT NO. : 5,253,001
DATED : October 12, 1993
INVENTOR(S) : Kiyoshi ALYFUKU, et al.

It is certified that error appears in the above-identified patent and that said Letters Patent is hereby corrected as shown below:

Column 1
    Line 33, "form" should read --form.--.
    Line 62, "has as its object" should read --its object is--.

Column 2
    Line 54, "an" should read --a--.

Column 4
    Line 6, "lengths," should read --lengths--.

Column 6
    Line 13, "photometring" should read --photometering--.
    Line 35, "as" should read --an--.

Column 7
    Line 17, "film," should read --film--.

Column 8
    Line 31, "23a" flickers," should read --23a, flickers--.

Column 9
    Line 65, "phtometering" should read --photometering--.

UNITED STATES PATENT AND TRADEMARK OFFICE
CERTIFICATE OF CORRECTION

PATENT NO. : 5,253,001
DATED : October 12, 1993
INVENTOR(S) : Kiyoshi ALYFUKU, et al.

It is certified that error appears in the above-identified patent and that said Letters Patent is hereby corrected as shown below:

Column 12
    Line 6, "embodiment," should read --embodiments,--.

Signed and Sealed this

Twenty-fourth Day of May, 1994

Attest:

BRUCE LEHMAN

Attesting Officer          Commissioner of Patents and Trademarks